United States Patent [19]

Wiseman

[11] Patent Number: 4,751,979
[45] Date of Patent: Jun. 21, 1988

[54] ENGINE NOISE SUPPRESSION KIT FOR THE NACELLES OF A JET AIRCRAFT

[75] Inventor: Albert D. Wiseman, Wilmington, Ohio

[73] Assignee: Airborne Express, Inc., Wilmington, Ohio

[21] Appl. No.: 735,058

[22] Filed: May 16, 1985

[51] Int. Cl.$^4$ .............................................. F01N 1/24
[52] U.S. Cl. ................................... 181/213; 181/222; 181/288; 181/293
[58] Field of Search ............... 181/213, 214, 217, 218, 181/222, 288, 293

[56] References Cited

U.S. PATENT DOCUMENTS

| | | | |
|---|---|---|---|
| 3,542,152 | 11/1970 | Adamson et al. | 181/222 X |
| 4,235,303 | 11/1980 | Dhoore et al. | 181/214 |
| 4,384,634 | 5/1983 | Shuttleworth et al. | 181/213 |
| 4,416,349 | 11/1983 | Jacobs | 181/288 X |
| 4,449,607 | 5/1984 | Forestier et al. | 181/213 |

Primary Examiner—Benjamin R. Fuller
Attorney, Agent, or Firm—Frost & Jacobs

[57] ABSTRACT

An engine noise suppression kit for use on the inside surfaces of the cowlings or doors of conventional jet aircraft nacelles surrounding the jet aircraft engines. Each nacelle cowling or door comprises a skin mounted on a framework made up of longitudinal stringers and transversely extending ribs or formers. The formers divide the inside surface of the nacelle cowlings or doors into bays surrounding the jet engine located within the nacelle. The kit comprises a plurality of sound attenuating modules adapted to be affixed to an adjacent pair of cowling or door formers and to span the bay defined thereby such that at least those bays surrounding the combuster chamber/turbine area of the jet engine are covered by said modules. Each module constitutes a sealed metallic basket comprising a pair of perforated metallic panels spaced from each other by a surrounding metallic framework. The facing surfaces of said metallic panels being covered by silicon rubber-coated glass cloth. Acoustic material fills the remaining space between said panels. The surrounding metallic framework of each module has laterally extending flanges by which the module is attached to those formers defining its respective bay. The modules are arranged end to end in their respective bays.

19 Claims, 6 Drawing Sheets

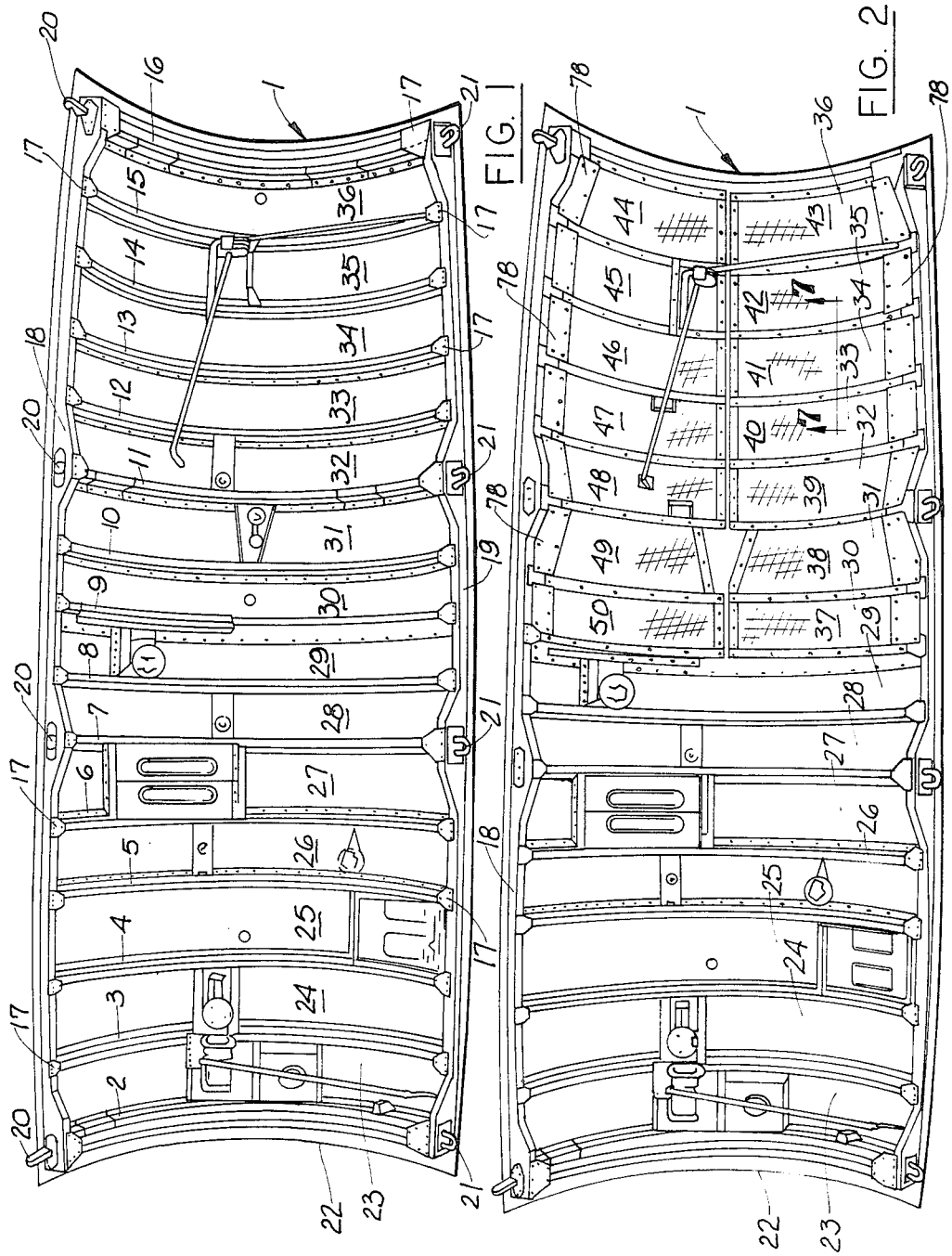

ENGINE NOISE SUPPRESSION KIT FOR THE NACELLES OF A JET AIRCRAFT

TECHNICAL FIELD

The invention relates to an engine noise suppression kit for jet aircraft, and more particularly to such a kit made up of a plurality of individual sound attenuating modules mountable to and between the ribs or formers of those portions of the nacelle cowlings or doors which surround the combuster chamber/turbine area of the jet engine located within the nacelle.

BACKGROUND ART

The Federal Aviation Administration has set permissible noise level requirements for the area about major metropolitan airports, which must be met by jet aircraft. This is true not only of newly manufactured jet aircraft, but also of jet aircraft manufactured before the permissible noise levels were determined. Prior art workers have devoted considerable time and energy to the development of various types of noise abatement means to meet these requirements. At the present time, the approved noise suppression equipment includes special treatment of the inlet and exhaust portions of the engine nacelles by the airframe manufacturers, together with noise abatement means applied directly to the jet engines themselves. Special inlet and exhaust section treatments by the airframe manufacturers do not constitute a part of the present invention and preferably are used in conjunction with the teachings of the present invention.

The application of noise attentuation means directly to the jet engine, itself, has proven to be a relatively expensive treatment. While affective, such treatment of the jet engine, itself, does not produce as significant a noise reduction as does the inlet and exhaust treatments. When noise attenuation means are applied to the jet engines of existing aircraft, this requires removal of the engines from the aircraft, dismantling of the engines, replacement of the engines on the aircraft and recertification. This is both time consuming and expensive.

The present invention is based upon the discovery that noise reduction at least equivalent to that achievable by applying noise attentuation means directly to the jet engine can be achieved far more easily and less expensively by applying the noise suppression kit of the present invention to the interior surface of at least that portion of the engine nacelle surrounding the combuster chamber/turbine area of the jet engine. The kit comprises a plurality of individual noise attenuating modules affixable to and between the ribs or formers of the engine nacelle cowlings or doors. This can be easily accomplished by the airframe manufacturer during production of an aircraft. In addition, however, due to the modular nature of the noise suppression kit of the present invention, it can readily be applied to already existing aircraft by the airlines themselves, without the necessity of removing and dismantling the jet engines. As will be discussed hereinafter, the noise suppression kit of the present invention is flight worthy and does not present a flight or operational hazard.

While not intended to be so limited, for purposes of an exemplary showing the noise suppression kit of the present invention will be described in its application to DC-9-30 series aircraft manufactured by Douglas Aircraft Co. of Long Beach, Calif. and equipped with any JT8D -7, -7a, -7b, -9, -9a or -11 engine manufactured by Pratt and Whitney Aircraft of Hartford, Conn.

DISCLOSURE OF THE INVENTION

According to the invention there is provided an engine noise suppression kit for use on the inside surfaces of the cowlings or doors of conventional jet aircraft nacelles surrounding the jet aircraft engines. Each cowling or door of an engine nacelle comprises a metallic skin affixed to a metallic framework. The metallic framework is made up of longitudinal stringers located near the longitudinal edges of the cowling or door and joined by transversely extending ribs or formers. The formers divide the inside surface of the nacelle cowling or door into bays which, when the nacelle is fully assembled, surround the jet engine located therewithin.

The kit of the present invention comprises a plurality of sound attenuating modules, each of which is adapted to be affixed to an adjacent pair of cowling or door formers and to span the bay defined thereby. The modules are arranged end-to-end within each bay. At least those bays surrounding the combuster chamber/turbine area of the jet engine are provided with the kit modules.

Each module constitutes a sealed metallic basket comprising a pair of perforated metallic panels spaced from each other by a surrounding metallic framework. The spaced metallic panels having their facing surfaces covered by silicon rubber-coated fabric which is affixed to the panels. The remaining space between the panels is filled with an acoustic material having excellent sound absorption characteristics within the 4,000 Hz to 6,000 Hz range. The surrounding metallic framework of each module has appropriate means (such as laterally extending flanges, or the like) on its longitudinal sides, by which the module is attached to those formers defining its respective bay.

The fully assembled kit of the present invention does not affect the structural integrity of the nacelle cowlings. The fully installed kit demonstrates satisfactory fluid drainage characteristics, and does not alter the basic temperature distribution within the nacelle during flight or ground operations. All materials used for the fabrication of the modules are approved for use in an aircraft jet engine compartment.

BRIEF DESCRIPTION OF THE DRAWINGS

FIG. 1 is a perspective view of the lower left-hand cowling or door of an exemplary jet aircraft engine nacelle.

FIG. 2 is a perspective view, similar to FIG. 1, and illustrating noise supression modules of the present invention mounted thereon.

DETAILED DESCRIPTION OF THE INVENTION

Figure 6:
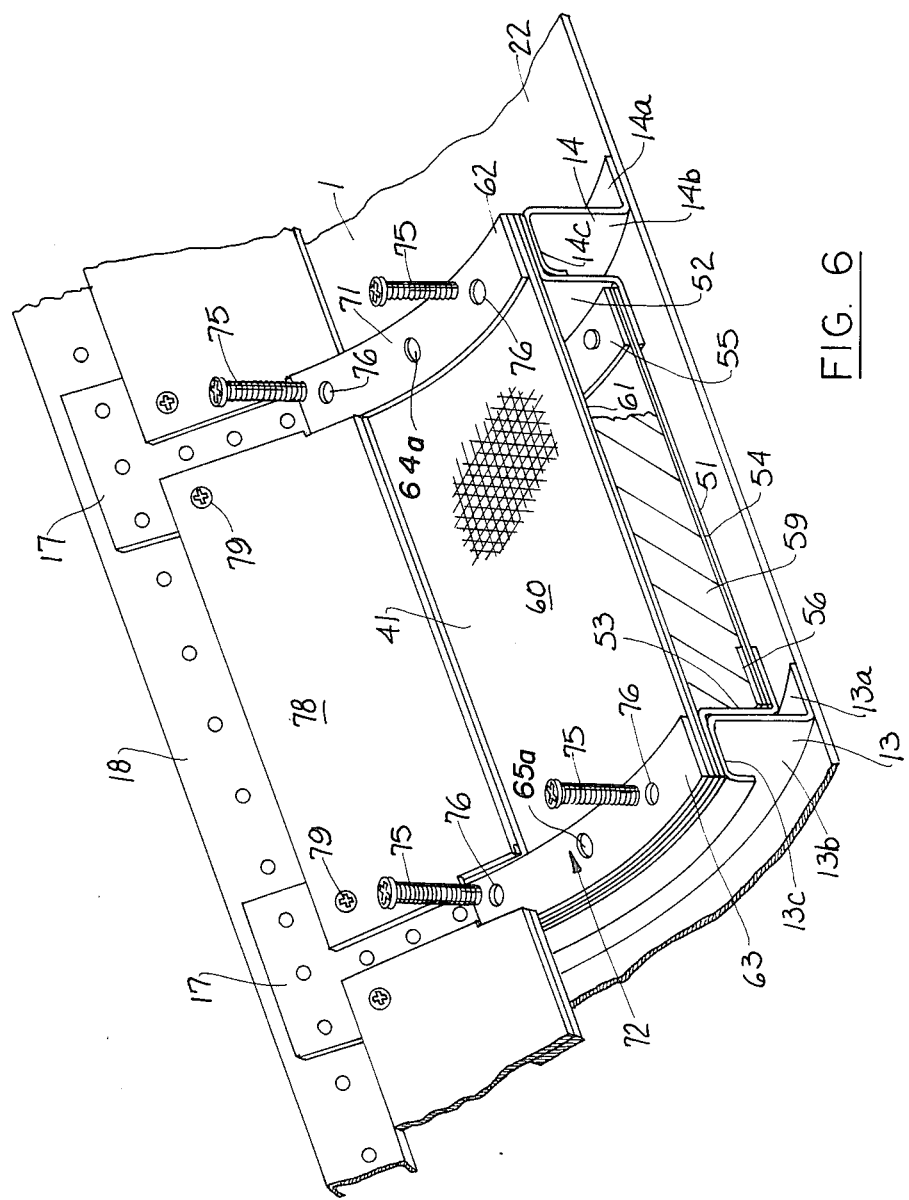
FIG. 6 is a fragmentary isometric view illustrating a portion of the nacelle door of FIGS. 1 and 2 and a module of the present invention mounted thereon.
Figure 7:
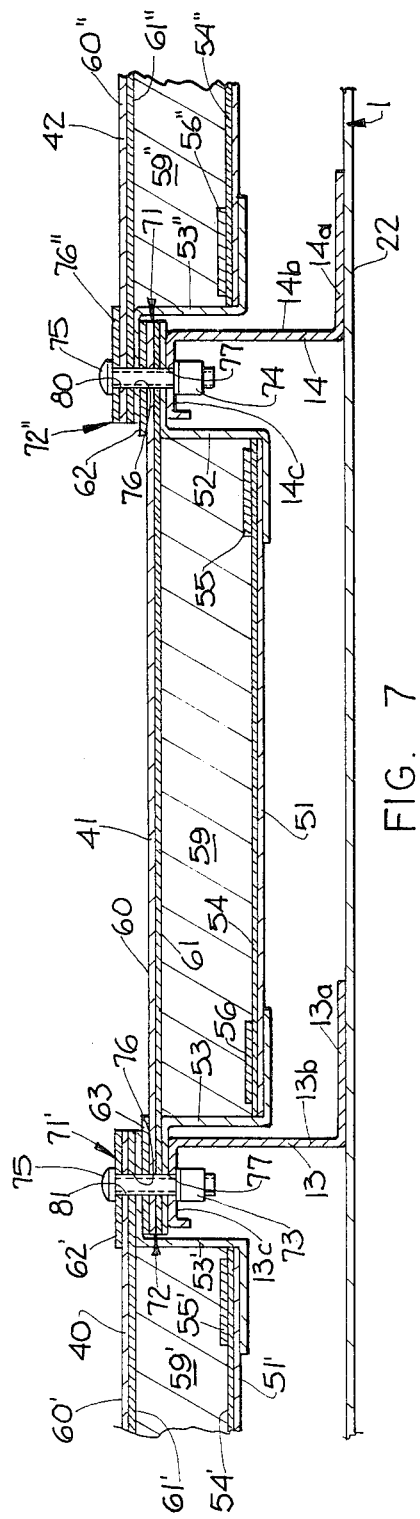
FIG. 7 is a fragmentary cross sectional view taken along section line 7—7 of FIG. 2.
Figure 8:
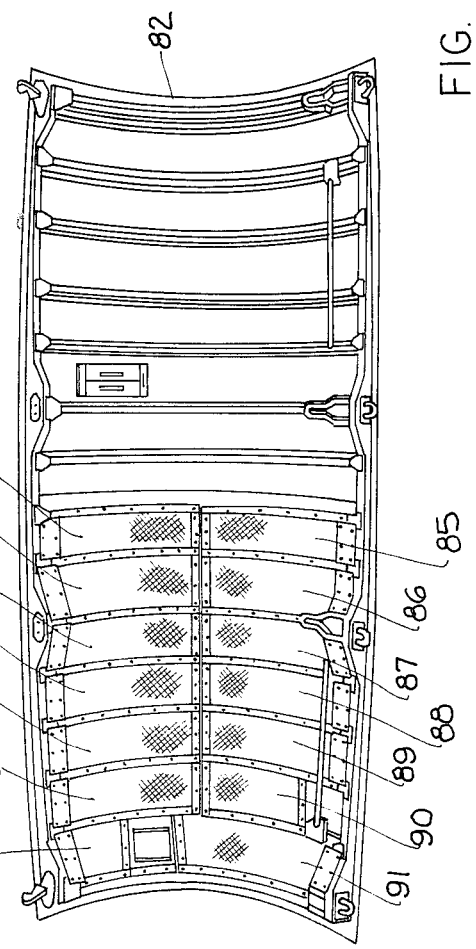
FIG. 8 is a perspective view, similar to FIG. 2, and illustrating modules of the present invention mounted on the inside surface of an upper left-hand nacelle cowling or door.
Figure 9:
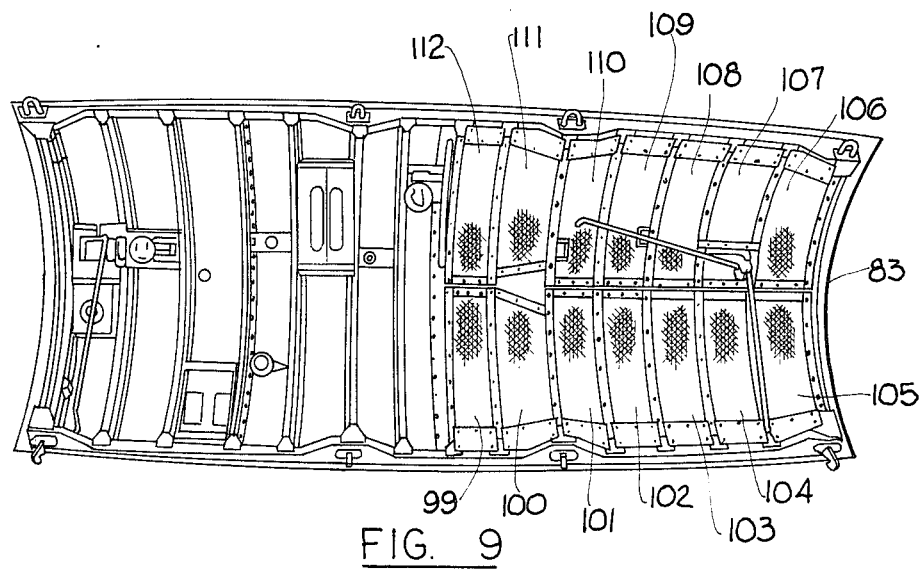
FIG. 9 is a perspective view, similar to FIG. 2, and illustrating modules of the present invention mounted on the inside surface of a lower right-hand nacelle cowling or door.
Figure 10:
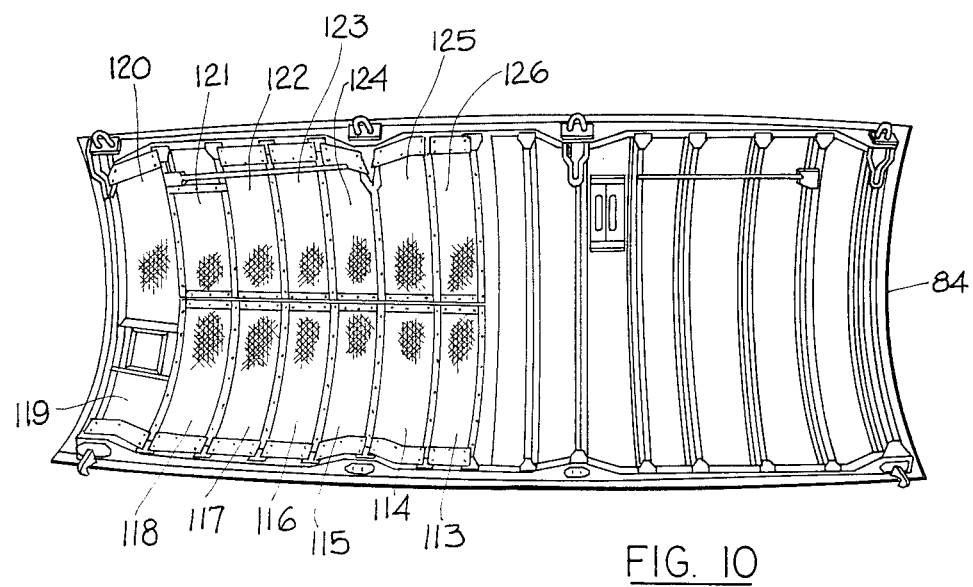
FIG. 10 is a perspective view, similar to FIG. 2, and illustrating modules of the present invention mounted on the inside surface of an upper right-hand nacelle cowling or door.

In the exemplary embodiment utilized to explain the nature of the present invention, the aircraft has two jet engines, the jet engine nacelle for each engine has two (upper and lower) cowling or door members. The lower left-hand engine nacelle door is illustrated in FIG. 1. Upper left-hand, lower right-hand and upper right-hand doors are illustrated in FIGS. 8, 9 and 10, respectively. All of the door members are of the same general construction, each being provided with its own particular appurtenances. The lower left-hand engine nacelle door of FIG. 1 is generally indicated at 1. The door 1 comprises a framework made up of a plurality of ribs or formers 2 through 16. The formers 2 through 16 differ from each other in length and configuration, but are generally formed of Z-shaped aluminum members, as shown in FIGS. 6 and 7. The formers 2 through 16 are provided with gussets 17 at their ends and are attached at their ends to a pair of longitudinally extending stringers 18 and 19. The stringer 18 carries a plurality of latches 20 and the stringer 19 carries a plurality of hinges 21. The latches 20 and hinges 21 constitute the means by which the two door elements are mounted and latched to the jet engine nacelle. The aluminum skin 22 of door 1 is appropriately affixed to the former and stringer framework.

The formers 2 through 16 divide the door 1 into 14 bays 23 through 36. As viewed in FIG. 1, the left-hand end of door 1 constitutes the forward end and the right-hand end of door 1 constitutes the rearward or aft end. The aft seven bays 30 through 36 of door 1, and the corresponding bays of the other door of the nacelle, surround the combuster chamber/turbine area of the jet engine. The engine noise supression kit of the present invention comprises a plurality of sound attenuating modules located in the aft seven bays, and affixed to the formers defining these bays, of each of the four nacelle doors.

Reference is now made to FIG. 2, wherein the door 1 of FIG. 1 is illustrated as having sound attenuating modules of the present invention affixed thereto. The modules are indicated at 37 through 50. It will be noted that in this particular embodiment each of the bays 30 through 36 requires two modules. Thus bay 30 contains modules 37 and 50, bay 31 contains modules 38 and 44, and so on.

All of modules 38 through 50 are of the same general construction. The modules differ from each other only in length, width and curvature, each being configured to extend approximately half the length of its respective bay. Selected ones of the modules are shorter, or have notches formed therein to accommodate various door appurtenances. In most of the bays, the adjacent ends of the modules for that bay are spaced from each other by about one-quarter inch, to provide drain space between the modules.

Figure 3:
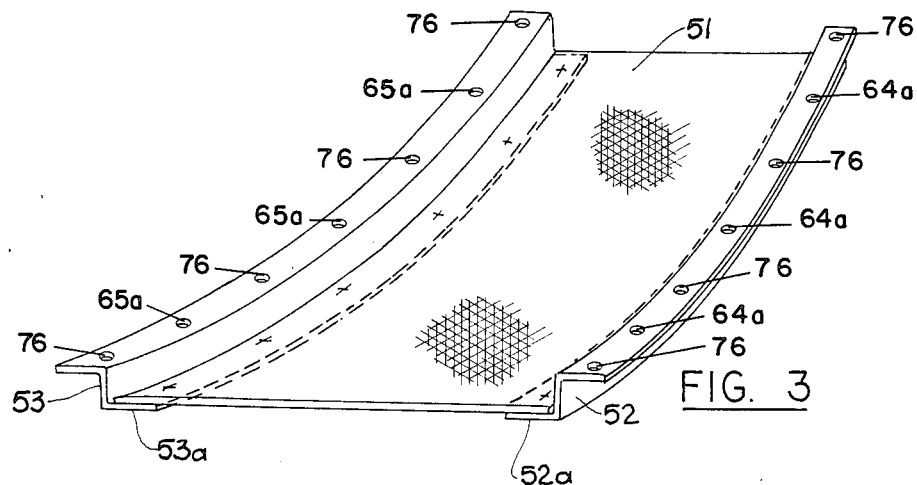
FIG. 3 is a perspective view illustrating the base portion of an exemplary module of the present invention.

Each module comprises acoustic material which fills up the space between the formers defining that bay for which the module is designed. The acoustic material is held in position by virtue of being located in a metallic basket affixed to the formers of its respective bay. The base portion of such a basket is illustrated in FIG. 3. The base portion of the basket comprises a perforated sheet aluminum panel 51. The longitudinal sides of the basket comprise a pair of Z-sections 52 and 53. The longitudinal edges of the perforated aluminum panel 51 are supported by the lower flanges 52a and 53a of Z-sections 52 and 53. The longitudinal edges of the perforated aluminum sheet 51 will be permanently affixed to the flanges 52a and 53a (by riveting or the like), as will be apparent hereinafter. As will also be apparent hereinafter, the Z-sections 52 and 53 will be shaped longitudinally to conform to the formers to which they are attached. The width of the basket base is tailored to the bay in which it is to be located, as is its length.

Figure 4:
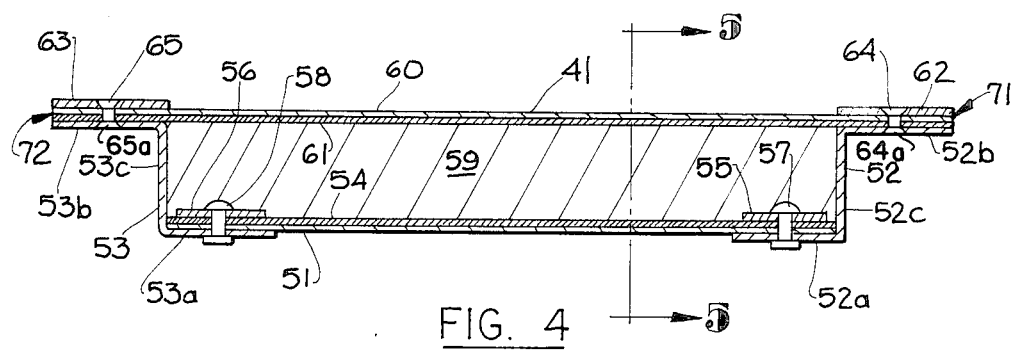
FIG. 4 is a transverse cross sectional view of an exemplary module of the present invention.

Reference is now made to FIG. 4. The perforated aluminum panel 51 is covered with a silicon rubber-coated glass cloth 54. The silicon rubber-coated surface of the glass cloth lies adjacent the perforated aluminum panel 51 and is adhesively bonded thereto to form a completely sealed basket. A pair of aluminum strips 55 and 56 overlie the longitudinal edges of the silicon rubber-coated glass cloth and the perforated aluminum panel 51, as well as the flanges 52a and 53a of Z-sections 52 and 53. A plurality of rivets, one of which is shown at 57, passes through the aliminum strip 55, the silicon rubber-coated glass cloth 54, the perforated aluminum panel 51 and the flange 52a of Z-section 52. In similar fashion, a plurality of rivets, one of which is shown at 58, passes through aluminum strip 56, the silicon rubber-coated glass cloth 54, the perforated aluminum panel 51 and the flange 53a of Z-section 53.

The base portion of the basket thus formed, is filled with a layer of acoustic material 59. The basket like module is closed by a perforated aluminum panel 60, similar to panel 51. The perforated aluminum panel 60 has bonded to its underside a layer of silicon-rubber coated glass cloth similar to the glass cloth layer 54, with its silicon-rubber coated surface adjacent the perforated aluminum panel 60. This assembly extends over the upper flanges 52b and 53b of Z-sections 52 and 53, as shown in FIG. 4. The longitudinal edges of the perforated aluminum panel 60 and silicon rubber-coated glass cloth layer 61, which overlie the Z-section flanges 52b and 53b, are themselves surmounted by aluminum strips 62 and 63. To complete this assembly, a plurality of rivets, one of which is shown at 64, passes through perforations, one of which is shown at 64a, in the aluminum strip 62, the perforated aluminum panel 60, the silicon rubber-coated glass cloth layer 61 and the flange 52b of Z-section 52. Similarly, a plurality of rivets, one of which is shown at 65, extends through perforations, one of which is shown at 65a, in the strip 63, the perforated aluminum panel 60, the silicon rubber-coated glass cloth layer 61 and the flange 53b of Z-section 53.

Figure 5:
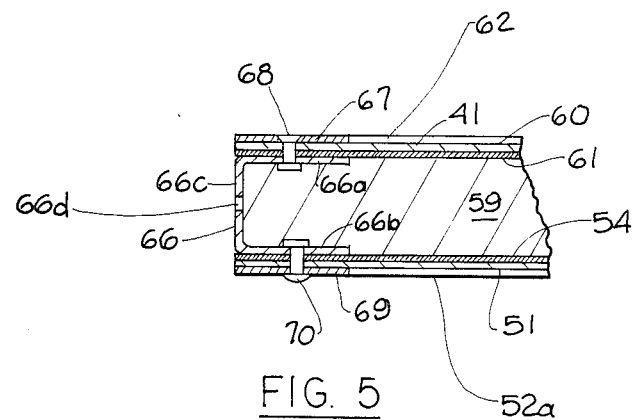
FIG. 5 is a fragementary cross sectional view taken along section line 5—5 of FIG. 4.

FIG. 5 is a longitudinal cross sectional view illustrating the upper ends of the module of FIG. 4, it being understood that both of the ends of the module of FIG. 4 are substantially the same in basic construction.

As has been noted above, the space between the upper perforated aluminum panel 60 and the lower perforated aluminum panel 51 is enclosed along the sides thereof by the central webs of the Z-sections 52 and 53. The ends of the module basket are closed by channel members, one of which is shown at 66 in FIG. 5.

The channel member 66 extends from the web portion 52c of Z-section 52 to the web 53c of Z-section 53. The channel member 66 has an upper flange 66a, a lower flange 66b and a connecting web 66c. It will be noted from FIG. 5 that the transverse edge portion of perforated aluminum panel 60 and its silicon rubber-coated glass cloth layer 61 overlie channel flange 66a. The transverse edge portions of perforated aluminum panel 60 and its silicon rubber-coated glass cloth layer are surmounted by an aluminum strip 67, which extends between the aluminum strips 62 and 63 (see FIG. 4). A plurality of rivets, one of which is shown at 68, join the assembly together. The lower perforated aluminum panel 51 and its silicon rubber-coated glass cloth layer 54 are similarly attached to channel flange 66b by means of aluminum strip 69 and a plurality of rivets, one of which is shown at 70. The aluminum strip 69 extends betweent the lower flanges 52a and 53a of Z-section 52 and 53. It will be noted that the web portion 66c of channel member 66 forms the end wall of the module basket, enclosing the end portion of the acoustic material 59. The channel member 66 of FIG. 5 may be considered as the channel member of the upper end of the module as installed. The web 66c of channel member 66 may be provided with two small diameter (about ⅛ inch diameter) vent holes, if desired. One such hole is shown at 66d in FIG. 5. The vent holes allow equalization of pressure within the module from ground level to altitude. The vent holes are located in the upper end of the module so no liquids can enter the module.

It will be understood that the acoustic material-containing basket of FIGS. 4 and 5 can represent any of the modules 37 through 50 of FIG. 2. Such modules have been made and extensively tested. Excellent results were achieved when the aluminum strips 55, 56, 62 and 63 of FIG. 4, the aluminum strips 67 and 69 of FIG. 5, the C-sections 52 and 53 of FIG. 4, and the channel 66 of FIG. 5 were fabricated of aluminum having a thickness of about 0.040 inch. The perforated aluminum panels 51 and 60 were made of aluminum having a thickness of about 0.025 inch. The perforations in panels 51 and 60 had a diameter of about 0.045 inch and were arranged in a straight pattern, being of such number that the panels 51 and 60 were about 37% open. The silicon rubber-coated glass cloth layers 54 and 61 were identical, having a weight of about 15 ounces per square yard. Material of this type can be obtained from Minnesota Mining & Manufacturing Company of Mourovia, Calif., under the designation SRG 2114 VC, from Fabri Cote, Los Angeles, Calif. under the designation 2127-2 and from Permacel of New Brunswick, N.J., under the designation P-552R. The purpose of the silicon rubber-coated glass cloth layers 54 and 61 is to protect the acoustic material 59 from water, fuel, oil, or hydraulic fluid leakage in the nacelle. The adhesive used to bind the silicon rubber-coated glass cloth layers 54 and 61 to their respective perforated aluminum panels 51 and 60 was manufactured by Minnesota Mining and Manufacturing Company of Mourovia, Calif., and sold under the designation EC-1300 P.S. 11001 TYPE I. The acoustic material 59 is a fibrous material and was manufactured by American Acoustical Products, Division Ward Process, of Natick, Mass., under the designation Hushcloth HT-NM. All joints and inside edges were sealed to insure a sealed unit or module. This was accomplished with a silicon sealant manufactured by General Electric Company, Silicon Products Department, of Waterford, N.Y., under the designation RTV-106. The sealant is used to prevent any water, fuel, oil or hydraulic fluid leakage in the nacelle from entering the sound suppression modules.

The exemplary manner in which the module of FIGS. 4 and 5 is attached to the nacelle cowling or door 1 is most clearly shown in the isometric view of FIG. 6. For purposes of an exemplary showing, it will be considered that the module of FIGS. 4 and 5 is module 41 of FIG. 2. For further convenience, the module flange comprising Z-section flange 52b, silicon rubber-coated glass cloth layer 61, perforated aluminum panel 60 and aluminum strip 62 will generally be designated as flange 71. Similarly, the module flange comprising the flange 53b of Z-section 53, silicon rubber-coated glass cloth layer 61, perforated aluminum panel 60 and aluminum strip 63 will be generally designated flange 72.

FIG. 6 is a fragmentary view of the nacelle cowling or door 1 showing its skin 22, formers 13 and 14, stringer 18 and the gussets 17 for each of the formers 13 and 14. The formers 13 and 14 are fabricated of aluminum Z-sections having outer flanges 13a and 14a to which the door skin 22 is affixed. The formers 13 and 14 have upstanding webs 13b and 14b, terminating in inner flanges 13c and 14c respectively. The underside of inner flanges 13c and 14c are provided with nut plates 73 and 74, respectively. The nut plates are clearly shown in FIG. 7. As will be evident from FIG. 6, the flanges 71 and 72 of module 41 rests upon and are supported by the inner flanges 14c and 13c, respectively, of formers 14 and 13. A plurality of machine screws, four of which are shown at 75, pass through perforations 76 in module flanges 71 and 72 and coaxial perforations 77 (see FIG. 7) in former flanges 13c and 14c, and are threadedly engaged in nut plates 73 and 74. Thus, module 41 is securely mounted on its respective pair of formers 13 and 14. The structure is finished bY providing an aluminum cover plate 78 which overlaps that end of module 74 nearest strinqer 18 and is affixed by machine screws 79 to gussets 17. It will be apparent from FIG. 2 that cover plates 78 are provided at both ends of bays 30 through 36, adjacent both stringer 18 and stringer 19.

FIG. 7 illustrates the manner in which adjacent modules are affixed to their respective formers of the cowling or door 1. To this end, the door 1 is shown together with formers 13 and 14. Modules 40, 41 and 42 are also shown. Since module 40 has the same qeneral construction as module 41, like parts have been given like index numerals followed by ('). Similarly, since module 42 has the same general construction as module 41, like parts have again been given like index numerals, in this instance followed by ("). It will be noted from FIG. 7 that the flanges 71 and 72 of module 41 rest directly on the inner flanges 14c and 13c of formers 14 and 13. The flange 72" of module 42 overlaps the flange 71 of module 41. The flange 72" of module 42 is provided with a plurality of perforations 80, coaxial with the perforations 76 of the flange 71 of module 41 and perforations 77 of former flange 14c. The machine screw 75 passes through all three perforations into nut plate 74 and thereby affixes both module 41 and 42 to the former 14. In similar fashion, the flange 71' of module 40 is provided with a plurality of perforations 81 coaxial with the perforations 76 of the flange 72 of module 41 and the perforations 77 of former 13. As in the case of module 42, the flange 71' of module 40 overlies the flange 72 of module 41 and is affixed to former 13 by the machine screws 75.

When the door 1 is provided with all of its modules, as shown in FIG. 2, modules 37, 39, 41, 43, 44, 46, 48 and 50 will have their flanges resting directly on the inner flanges of their respective formers. Modules 38, 40, 42, 45, 47 and 49 will have their flanges overlying the flanges of the adjacent modules. It will be noted in FIG. 7 that all of the modules are spaced from nacelle skin 22. This assures proper drainage within the nacelle.

FIGS. 8, 9 and 10 illustrate, respectively, the upper left-hand cowling or door 82, the lower right-hand cowling or door 83, and the upper right-hand cowling or door 84 of the nacelles. The forward end of cowling or door 82 is at the right, as viewed in FIG. 8. The forward end of cowling or door 83 is at the left, as viewed in FIG. 9. Finally, the forward end of cowling or door 84 is at the right, as viewed in FIG. 10. The general construction of cowlings or doors 82, 83 and 84 is similar to that of door 1 of FIGS. 1 and 2. Each door has it particular appurtenances, which do not constitute a part of the present invention. Some of the appurtenances require special tailoring of the modules of the present invention, as described above. The upper left-hand cowling or door 82 of FIG. 8 is shown provided with 14 modules of the present invention, located in the last or rearward 7 bays of the door 82, and indicated at 85 through 98. In FIG. 9, the last or rearward 7 bays of cowling or door 83 are shown provided with modules of the present invention, indicated at 99 through 112. Similarly, the rearward 7 bays of cowling or door 84 of FIG. 10 are shown provided with modules of the present invention, indicated at 113 through 126. It will be understood that all of the modules of all 4 cowlings or doors 1, 82, 83 and 84 will have the same general construction described with respect to FIGS. 3, 4 and 5, and will be affixed to their respective cowlings or doors in the manner described with respect to FIGS. 6 and 7.

Figure 11:
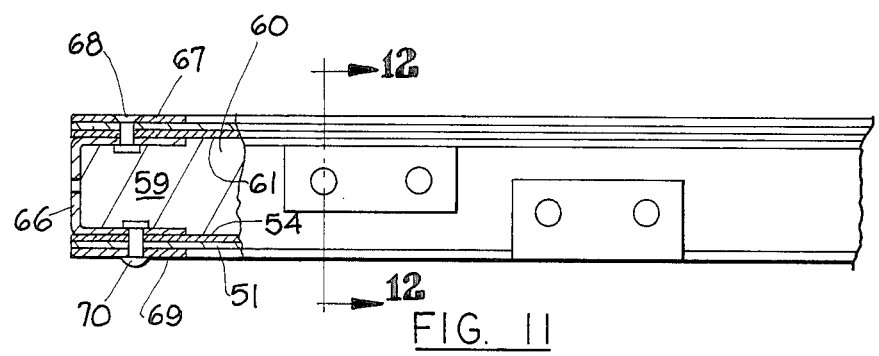
FIG. 11 is a fragmentary side elevation, partly in cross section, of another embodiment of module of the present invention.
Figure 12:
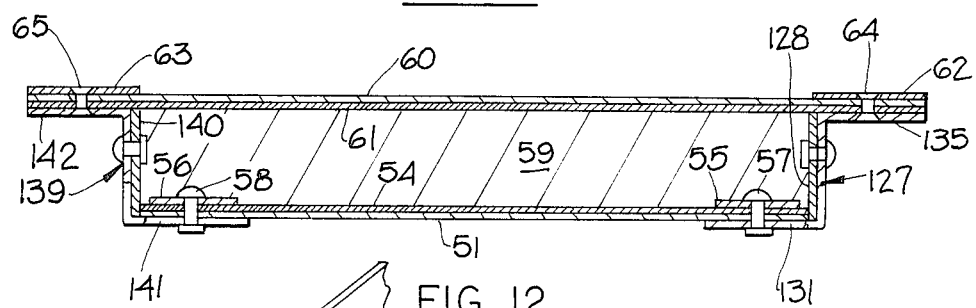
FIG. 12 is a cross sectional view taken along section line 12—12 of FIG. 11.
Figure 13:
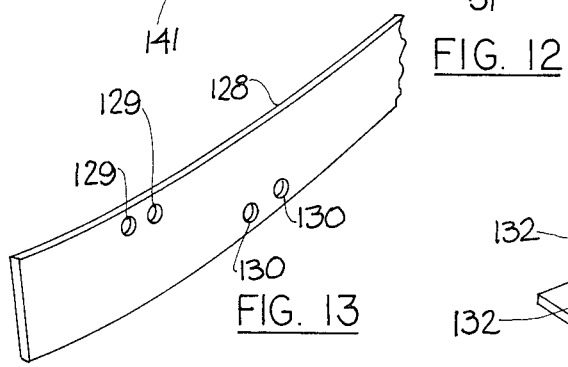
FIG. 13 is a fragmentary perspective view of a web portion of a three-piece fabricated Z-section.

Reference is now made to FIGS. 11 through 15. In these FIGURES a second and preferred embodiment of the module of the present invention is illustrated. Turning first to FIGS. 11 and 12, the module shown therein differs from the module described with respect to FIGS. 4 and 5 only in that the z-sections constitute three-piece fabricated elements, rather than one-piece, integral structures, as in the case of z-sections 52 and 53 of FIG. 4. Since this is the only difference, all other like parts have been given the same index numerals. The right-hand z-section, as viewed in FIG. 11, is generally indicated at 127. This z-section comprises a planar web portion 128 which is also shown in FIG. 13. The web portion 128 has a longitudinal curvature generally matching the longitudinal curvature of the former (not shown) to whch the z-section 127 is to be affixed. Web portion 128 is provided with pairs of perforations, two of which are shown at 129—129 and 130—130. The purpose of these perforations will be apparent hereinafter.

Figure 14:
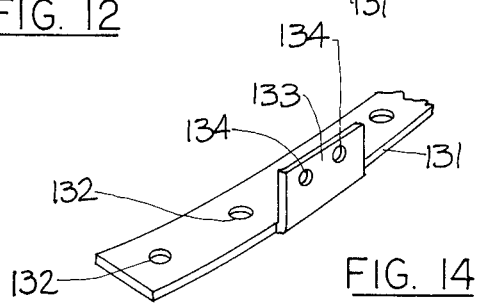
FIG. 14 is a fragmentary perspective view of a lower flange portion of a three-piece frabricated Z-section.
Figure 15:
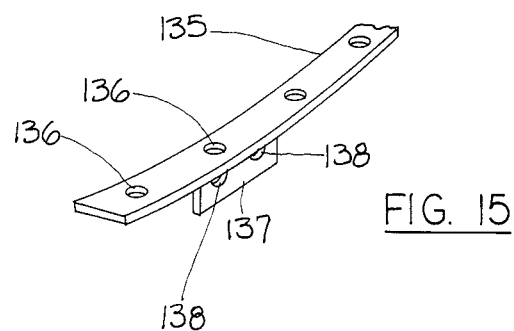
FIG. 15 is a fragmentary perspective view of an upper flange portion of a three-piece frabricated Z-section.

The lower flange portion 131 of z-section 127 constitutes a seaparte piece and is additionally illustrated in FIG. 14. Lower flange portion 131 comprises a strip-like member having a longitudinal curvature matching the lower edge of web portion 128. It will be provided with a plurality of spaced perforations 132 for receiept of rivets 57 (see FIG. 11). Spaced along its outer edge, the lower flange is provided with upstanding lugs, one of which is shown at 133. The lug 133 is provided with a pair of perforations 134—134. When the lower flange portion 132 is located adjacent the lower edge of web portion 128, each pair of perforations 134—134 in each upstanding lug 133 will be coaxial with a pair of perforations 130—130 in the web portion 128, for the receipt of rivets by which the lower flange portion 131 is securely attached to the web portion 128. The upper flange portion 135 is also shown in FIG. 15. The upper flange 135 is provided with a longitudinal curvature matching the upper edge of web portion 128. It is also provided with a plurality of holes 136 for receipt of rivets 64 (see FIG. 11). Spaced along its inner edge, the upper flange portion 135 is provided with downwardly extending lugs, one of which is shown at 137. Each of the lugs is provided with a pair of perforations 138—138. When the upper flange portion 135 is located on the outside surface of web portion 128 and aligned with the upper edge thereof, the pairs of perforations 138—138 in each of the lugs 137 will be coaxial with pairs of perforations 129—129 in web portion 128. The aligned perforations are adapted to receive rivets by which the upper flange portion 135 is firmly affixed to the web portion 128.

It will be understood that the left-hand Z-section generally indicated at 139 in FIG. 11 will be fabricated in precisely the same manner, having a planar web portion 140, a lower flange portion 141 and an upper flange portion 142. Lower flange portion 141 and upper flange portion 142 will be essentially mirror images of lower flange portion 131 and upper flange portion 135. The fabrication technique for the Z-section, just described, is preferred as being an easier, more efficient and more reliable fabrication technique, than making each Z-section an integral, one-piece element. This fabrication technique may be used for all of the Z-sections of all of the modules for each of the cowlings or doors 1, 82, 83 and 84.

The manner in which the individual modules are made and the way in which they are affixed in their respective bays of their respective doors having bee described in detail, it will be apparent from FIGS. 2, 8, 9 and 10 that the engine noise suppression kit of the present invention comprises 14 modules for each of cowlings or doors 1, 82, 83 and 84, for a total of 56 individual modules. As was indicated above, the present invention has been described, for purposes of an exemplary showing, in its application to the engine nacelles of a DC-9-30 series aircraft, powered by any one of the series of JT 8D -7, -7a, -7b, -9, -9a or -11 engines. It will be understood by one skilled in the art that when the invention is applied to aircraft built by other manufacturers and powered by other engines, the modules making up the engine noise suppression kit may differ in number, shape and size, depending upon the construction of the engine nacelles and the number of bays thereof to be treated. For example, some engine nacelles have from four to six cowlings or doors. Some installations might require mounting means other than the lateral flanges taught herein. Any mounting means would suffice so long as the modules are spaced from the nacelle skin and adequate clearance for the engine is provided. Under some circumstances, a single large module might be substituted for a plurality of smaller ones. Nevertheless, the general construction will be the same and the modifications required are well within the skill of the worker in the art.

The engine noise suppression kit of the present invention was installed in the nacelles of a DC-9-30 series aircraft having JT 8D-7 jet engines. This was compared in both ground and flight tests with a similar aircraft, having similar engines wherein noise suppression means were applied directly to the engines themselves. It was found that the engine-applied suppression means were most effective in the 2,000 to 6,000 Hz frequency range. The acoustic material 59 used in the present invention has been determined to have sound absorption characteristics such that the percent absorption at 2,000 Hz is approximately 95%, and reaches approximately 100% at 4,000 Hz. The percent absorption at 8,000 Hz is believed to be at least 95%. The ground and flight tests clearly showed that during takeoff, cutback and approach power settings the engine noise suppression kit of the present invention was fully as effective as the prior art suppression means applied directly to the engine.

Calculations have also shown that the resultant weight and moment that must be reacted by the pylon is approximately the same for both the engine noise suppression kit of the present invention and the prior art noise suppression means supplied directly to the engine. It has further been concluded that the addition of the noise suppression kit of the present invention will not affect the structural integrity of the nacelle cowlings.

Three additional tests were conducted to insure that the engine noise suppression kit of the present invention would be compatible with the environment in which it is placed. These tests included nacelle drainage tests to insure that an unacceptable amount of fuel, if spilled into the nacelle, would not be retained within the nacelle cavity. Temperature tests were made to determined if the engine noise suppression kit of the present invention changed the temperature environment within the nacelle cavity. Finally, material flammability tests of the acoustical material 59 were conducted to insure that it would meet the necessary flammability requirements. Conventional nacelle drainage tests proved that the engine noise suppression kit of the present invention constitutes a satisfactory configuration regarding fluid drainage. Both in-flight and ground tests showed that the engine noise suppression kit of the present invention did not adversely affect the temperature environment within the engine compartment. Finally, the acoustic material 59 did meet the flammability requirements.

From the above, it will be apparent that the engine noise suppression kit of the present invention is a far simpler and less expensive solution to the problem of engine noise. It can be readily applied to the engine nacelle cowlings or doors by the air frame manufacturer. Its modular design also lends itself well to be used as a retrofit kit, eliminating the necessity of removing the aircraft engines, dismantling them, applying noise suppression means to them, reinstalling the engines and recertification thereof, all as is required by the above noted prior art approach.

Modifications may be made in the invention without departing from the spirit of it. For example, materials other than the silicon rubber-coated glass cloth and the fibrous acoustical material could be used so long as they would serve the same purpose, have similar characteristics and meet the standards required for aircraft manufacture.

What is claimed is:

1. An engine noise suppression kit for use in association with a jet aircraft engine nacelle surrounding a jet engine of the type having a chamber/turbine area, said nacelle being of the type having openable doors, said kit comprising at least one sound attenuation module for each door shaped to conform to the inside surface of at least that portion of its respective door adjacent said combuster chamber/turbine area of said engine, means to mount said at least one module in spaced relationship to the inside surface of said door portion, each of said modules constituting a sealed basket, said basket comprising a pair of perforated panels spaced from each other by and fixed to a surrounding frame work, a layer of acoustical material located between said perforated panels, a protective sheet-like layer located between said acoustical material and each perforated panel to protect said acoustical material from water, fuel, oil and hydraulic fluid, said mounting means being affixed to said framework.

2. The noise suppression kit claimed in claim 1 wherein each of said doors is of the type comprising a skin affixed to a framework, said framework comprising at least a pair of stringers extending longitudinally of said door adjacent the longitudinal edges thereof and a plurality of formers extending transversely of said door and joining said stringers, said formers dividing the inside surface of said door into transverse bays, said kit comprising a plurality of said sound attenuating modules adapted to be located in at least those bays adjacent said combuster chamber/turbine area of said engine, each of said modules being so shaped so as to be affixed to and extend between an adjacent pair of said formers defining its respective bay, said modules being arranged end-to-end within their respective bays essentially covering said bays, and being spaced from said skin.

3. The engine noise suppression kit claimed in claim 3 wherein said acoustical material comprises a fibrous mat having sound absorption characteristics within the range of from about 4000 Hz to about 6000 Hz.

4. The engine suppression kit claimed in claim 1 wherein said perforated panels and said surrounding framework are made of aluminum.

5. The engine noise suppression kit claimed in claim 1 wherein said protective layers comprise glass cloth coated on one side with silicon rubber.

6. The engine noise suppression kit claimed in claim 1 wherein all joints and inside edges of said basket are sealed with a silicon adhesive sealant.

7. The engine noise suppression kit claimed in claim 1 wherein said perforated panels and said framework are contoured to substantially correspond to the adjacent portion of said nacelle skin.

8. The engine noise suppression kit claimed in claim 2 wherein said panels and said framework of each of said modules are contoured to substantially conform to the adjacent portion of said nacelle skin and the adjacent formers defining the bay for said module, said module framework comprising a pair of end members and a pair of longitudinal side members of Z-shaped cross section having a central web terminating at its longitudinal edges in inner and outer oppositely directed flanges, one of said perforated panels being mounted on said outer flanges, the other of said perforated panels being mounted on said inner flanges, said outer flanges overlying said formers defining said bay for said module, said outer flanges being affixed to said formers and comprising said module mounting means.

9. The engine noise suppression kit claimed in claim 8 wherein said acoustical material comprises a fibrous mat having sound absorption characteristics within, the range of from about 4000 Hz to about 6000 Hz.

10. The engine suppression kit claimed in claim 8 wherein said perforated panels and said surrounding framework are made of aluminum.

11. The engine noise suppression kit claimed in claim 8 wherein said protective layers comprise glass cloth, coated on one side with silicon rubber.

12. The engine noise suppression kit claimed in claim 2 wherein all joints and inside edges of said basket are sealed with a silicon adhesive sealant.

13. The engine noise suppression kit claimed in claim 4 wherein said perforated panels are about 37% open.

14. The engine noise suppression kit claimed in claim 5 wherein each protective layer has its silicon rubber-coated side bonded to the adjacent perforated panel.

15. The engine noise suppression kit claimed in claim 8 wherein said longitudinal Z-shaped side members each comprises an integral, one-piece element.

16. The engine noise suppression kit claimed in claim 8 wherein each of said Z-shaped longitudinal side members comprises a planar web portion and separate inner 17. The engine suppression kit claimed in claim 11 wherein said perforated panels and said surrounding framework are made of aluminum.

18. The engine noise suppression kit claimed in claim 17 wherein said protective layers comprise glass cloth coated on one side with silicon rubber.

19. The engine noise suppression kit claimed in claim 18 wherein all joints and inside edges of said basket are sealed with a silicon adhesive sealant.

* * * * *